(12) United States Patent
Wei

(10) Patent No.: US 6,478,251 B2
(45) Date of Patent: Nov. 12, 2002

(54) FLIER STRUCTURE

(75) Inventor: Ming-Ta Wei, No. 48, Tai-Ping 10$^{th}$ St., Tai-Ping City, Taichung Hsien (TW)

(73) Assignees: Tien Lung Chang, Taichung Hsien (TW); Kun Lin Chuang, Taichung Hsien (TW); Ming-Ta Wei, Taichung Hsien (TW)

( * ) Notice: Subject to any disclaimer, the term of this patent is extended or adjusted under 35 U.S.C. 154(b) by 0 days.

(21) Appl. No.: 09/985,196

(22) Filed: Nov. 2, 2001

(65) Prior Publication Data

US 2002/0130217 A1 Sep. 19, 2002

(30) Foreign Application Priority Data

Mar. 13, 2001 (TW) ........................................ 90203686 U

(51) Int. Cl.$^7$ ............................. B64C 31/02; B64C 3/00
(52) U.S. Cl. ................. 244/16; 244/35 R; 244/198; 244/45 R; 446/34; 446/61; 446/66
(58) Field of Search ................ 244/35 R, 198, 244/45 R, 16; 446/34, 61, 66

(56) References Cited

U.S. PATENT DOCUMENTS

| | | | |
|---|---|---|---|
| 3,108,768 A | * | 10/1963 | Thomas ........................ 244/13 |
| 4,280,673 A | * | 7/1981 | Brzack ......................... 244/13 |
| 4,856,736 A | * | 8/1989 | Adkins et al. ............. 244/45 R |
| 6,095,458 A | * | 8/2000 | Cripe ...................... 244/153 R |

* cited by examiner

Primary Examiner—J. Woodrow Eldred
(74) Attorney, Agent, or Firm—Rosenberg, Klein & Lee

(57) ABSTRACT

A flier structure including a fuselage extending from front side to rear side and a weight body connected with front end of the fuselage. A port wing and a starboard wing respectively leftward and rightward extend from the fuselage. A left tailfin and a right tailfin respectively extend from rear sides of the port wing and starboard wing. The bottoms of front edges of the port wing and starboard wing are respectively connected with a left and a right flow deflecting wings. The rear sides of the left and right flow deflecting wings are respectively spaced from the port wing and starboard wing by a predetermined distance. The left and right flow deflecting wings are respectively connected with the left and right sides of the fuselage. The disconnected portions between the left flow deflecting wing and port wing and the right flow deflecting wing and starboard wing respectively form two flow deflecting spaces.

3 Claims, 6 Drawing Sheets

FLIER STRUCTURE

BACKGROUND OF THE INVENTION

The present invention is related to an improved flier structure in which a left and a right flow deflecting wings are disposed under the bottoms of the port wing and starboard wing of the flier so as to form two flow deflecting spaces for increasing elevating force.

FIG. 6 shows a flier having a fuselage 7 and a port wing 8 and a starboard wing 9 on two sides of middle portion of the fuselage 7. A tailfin 71 is disposed at rear end of the fuselage 7. Such flier is generally made of light material such as paper or polylon. In order to have a better inertia when thrown out, a weight 72 is disposed at the front end of the fuselage 7 to keep the flier balanced when flying. When flying, the port wing 8 and starboard wing 9 by means of air buoyancy can independently prevent the flier from quickly dropping down. However, the port wing 8 and starboard wing 9 cannot automatically control and increase the air buoyancy. Therefore, the time of flight of the flier in the air cannot be prolonged.

SUMMARY OF THE INVENTION

It is therefore a primary object of the present invention to provide an improved flier structure in which a left and a right flow deflecting wings are disposed under the bottoms of the port wing and starboard wing of the flier so as to enhance flow deflection to the bottoms of the port wing and starboard wing and increase elevating force for the flier and prolong the time during which the flier stays in the air. The widths of the outer sides of the left and right flow deflecting wings are tapered so as to stabilize the flier during flight.

The present invention can be best understood through the following description and accompanying drawings wherein:

DETAILED DESCRIPTION OF THE PREFERRED EMBODIMENTS

Figure 1:
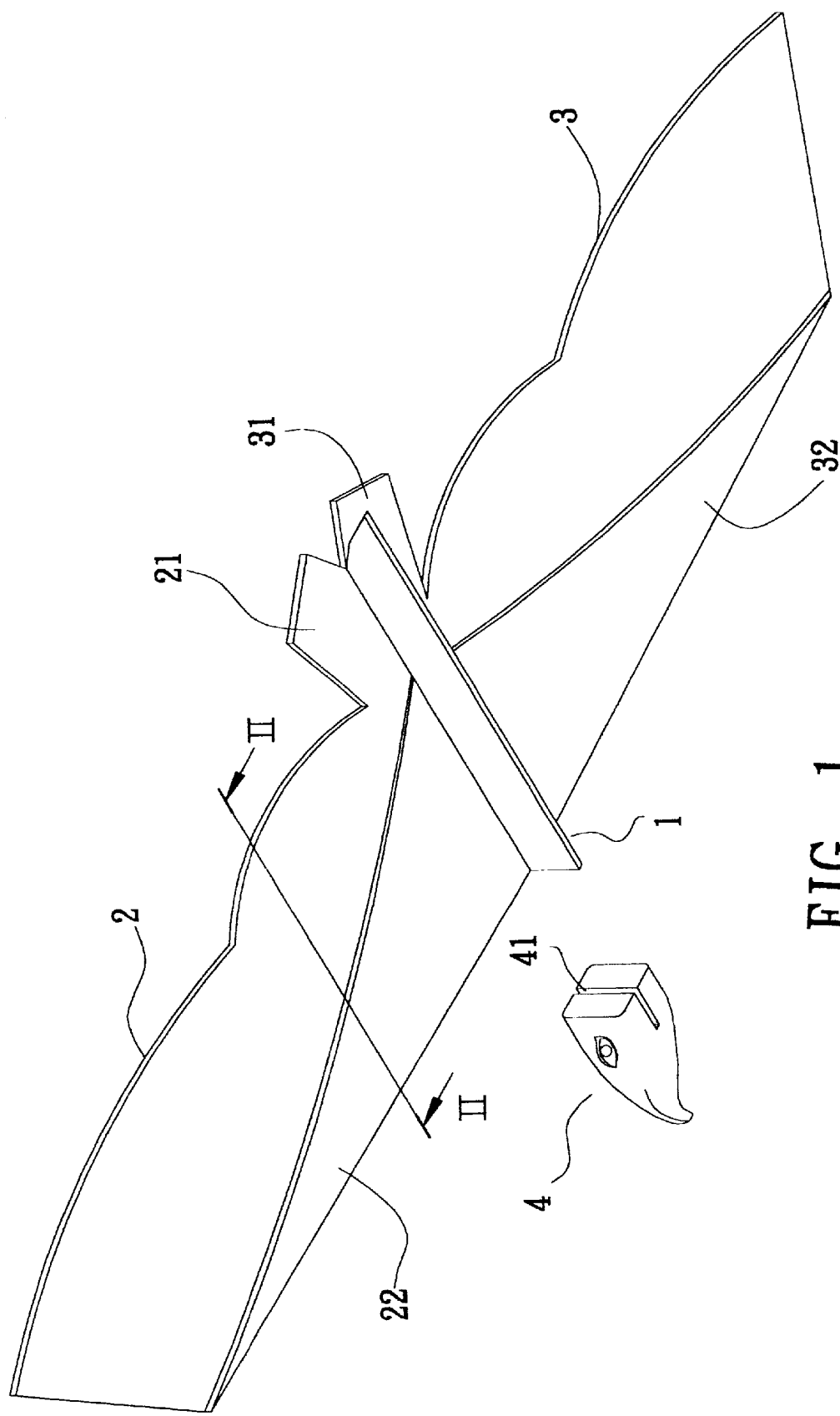
FIG. 1 is a perspective exploded view of a first embodiment of the present invention.
Figure 2A:
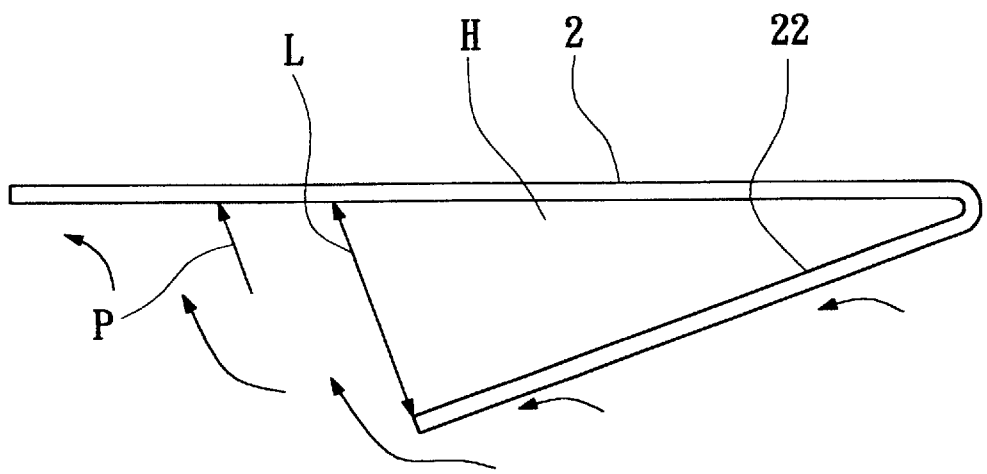
FIG. 2A is a sectional view taken along line II—II of FIG. 1.
Figure 2B:
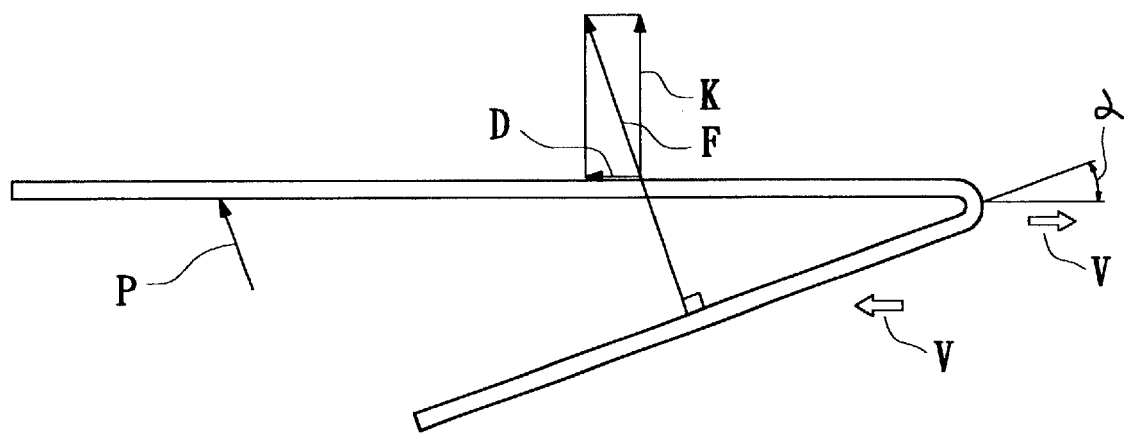
FIG. 2B is a view according to FIG. 2A, showing the force components exerted onto the port wing and starboard wing during flight.
Figure 3:
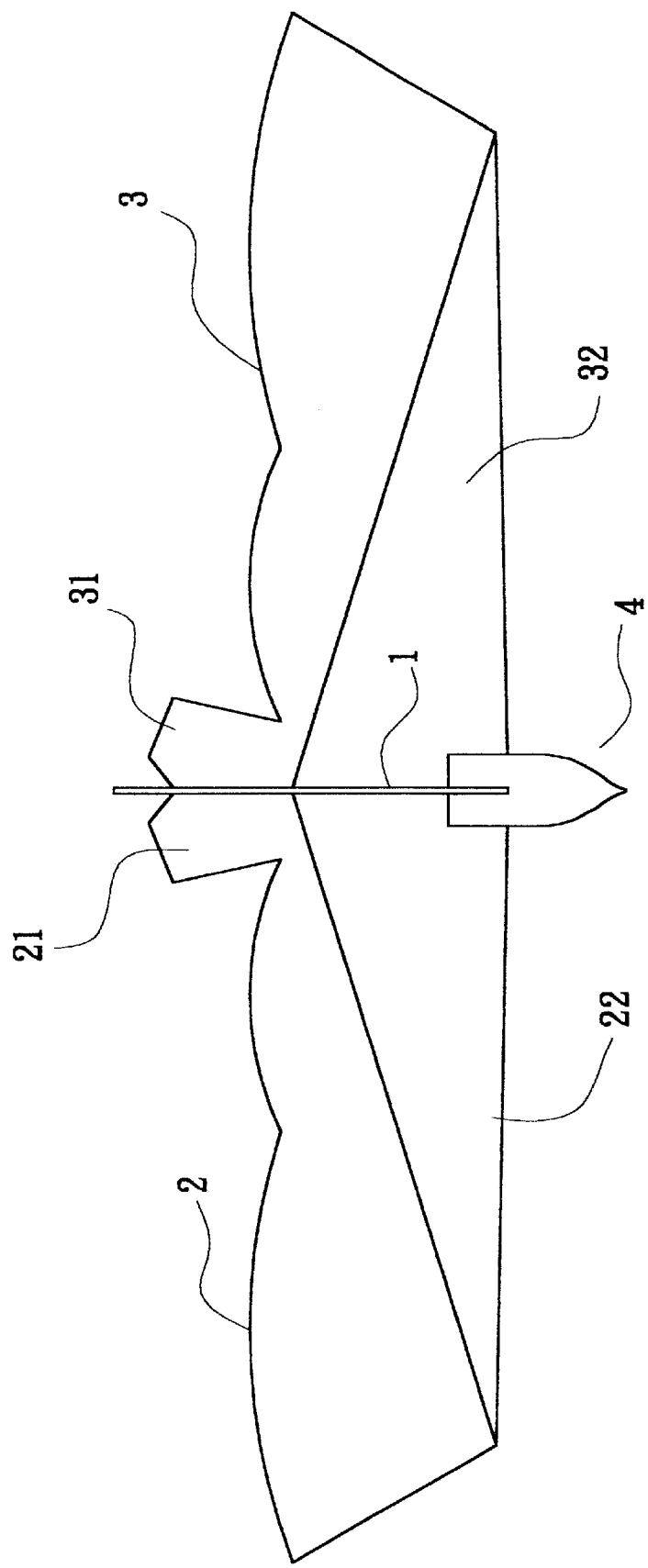
FIG. 3 is a bottom view of the first embodiment of the present invention.

Please refer to FIGS. 1 to 3. The flier structure of the present invention includes a fuselage 1 extending from front side to rear side. A weight body 4 having a form of a bird head is connected with front end of the fuselage 1. The rear side of the weight body 4 is formed with an insertion split 41 extending through the rear side from upper side to lower side of the weight body 4. The front end of the fuselage 1 is inserted into the insertion split 41 and clamped between the walls thereof. A port wing 2 and a starboard wing 3 respectively leftward and rightward extend from the top of the fuselage 1. The port wing 2 and starboard wing 3 have corresponding predetermined shape. In this embodiment, the port wing 2 and starboard wing 3 are like wings of a bird. A left tailfin 21 and a right tailfin 31 respectively extend from rear sides of the port wing 2 and starboard wing 3. The bottoms of the front edges of the port wing 2 and starboard wing 3 are respectively connected with a left and a right flow deflecting wings 22, 32. The rear sides of the left and right flow deflecting wings 22, 32 are respectively spaced from the port wing 2 and starboard wing 3 by a predetermined distance L. The left and right flow deflecting wings 22, 32 are respectively connected with the left and right sides of the fuselage 1. In addition, the left and right flow deflecting wings 22, 32 are respectively tapered toward the opposite outer sides and front sides of the port wing 2 and starboard wing 3.

It should be noted that the rear sides of the left and right flow deflecting wings 22, 32 are respectively spaced from the port wing 2 and starboard wing 3 by the distance L. The inclinedly downward extending left and right flow deflecting wings 22, 32 and the port wing 2 and starboard wing 3 respectively contain an acute angle α. In fluid dynamics, according to Newton's third law of motion, the acute angle α can be decomposed as shown in FIG. 2B. The port wing 2 and starboard wing 3 fly forward by speed V. Relatively, the wind flows along and through the top faces of the port wing 2 and starboard wing 3 and the bottom faces of the left and right flow deflecting wings 22, 32 by speed V'. Accordingly, an aerodynamic force F normal to the left and right flow deflecting wings 22, 32 is created. The aerodynamic force F can be decomposed into two components. One is an elevating force K normal to the direction of the wind, while the other is a resistance D in parallel to the direction of the wind. The elevating force K is able to push up the entire port wing 2 and starboard wing 3 so that the flier has a better elevating force.

In addition, the disconnected portions between the left flow deflecting wing 22 and port wing 2 and the right flow deflecting wing 32 and starboard wing 3 respectively form two flow deflecting spaces H. When flying, the air is deflected in the spaces H. After the air is deflected by the left and right flow deflecting wings 22, 32, the air flows toward the bottoms of the port wing 2 and starboard wing 3. Accordingly, a second elevating force P is exerted onto the port wing 2 and starboard wing 3 from the bottoms of the flow deflecting spaces H.

In use, the front end of the fuselage 1 is first inserted into the insertion split 41 of the weight body 4 at a better depth. Then, a user ( not shown ) holds the middle portion of the fuselage 1 and throws out the flier. At this time, the flier inertially flies forward and the weight body 4 serves to depress the front end of the fuselage 1. The top faces of the left tailfin 21 and right tailfin 31 are stopped by the air to press the fuselage 1 backward. Therefore, the front and rear sides of the fuselage 1 are balanced. Moreover, when flying, the rear sides of the left and right flow deflecting wings 22, 32 are slightly vaccumized, whereby the air can flow from the lower sides of the left and right flow deflecting wings 22, 32 toward the flow deflecting spaces H and the rear sides thereof to deflect the flow. This deflection of flow makes the air blow the bottom faces of the port wing 2 and starboard wing 3 as shown in FIG. 2A. Therefore, the port wing 2 and starboard wing 3 can obtain the second elevating force P and have better elevating force. Furthermore, the inclinedly downward extending left and right flow deflecting wings 22, 32 and the port wing 2 and starboard wing 3 respectively contain an acute angle α. Accordingly, the port wing 2 and starboard wing 3 obtain the other elevating force K so that the flier of the present invention can stay in the air longer.

In addition, the widths of the opposite outer sides of the left and right flow deflecting wings 22, 32 are tapered. During flight, the inner sides of the left and right flow deflecting wings 22, 32 adjacent to the fuselage 1 are subject to greater flow deflection, while the outer sides thereof are subject to less flow deflection (as shown in. FIG. 3), whereby the port wing 2 and the starboard wing 3 are subject to flow deflection in balanced state so as to stabilize the flier.

The left and right flow deflecting wings 22, 32 enhance the flow deflection to the bottom of the port wing 2 and starboard wing 3 so as to increase the elevating force exerted onto the flier and prolong the time during which the flier stays in the air.

Figure 4:
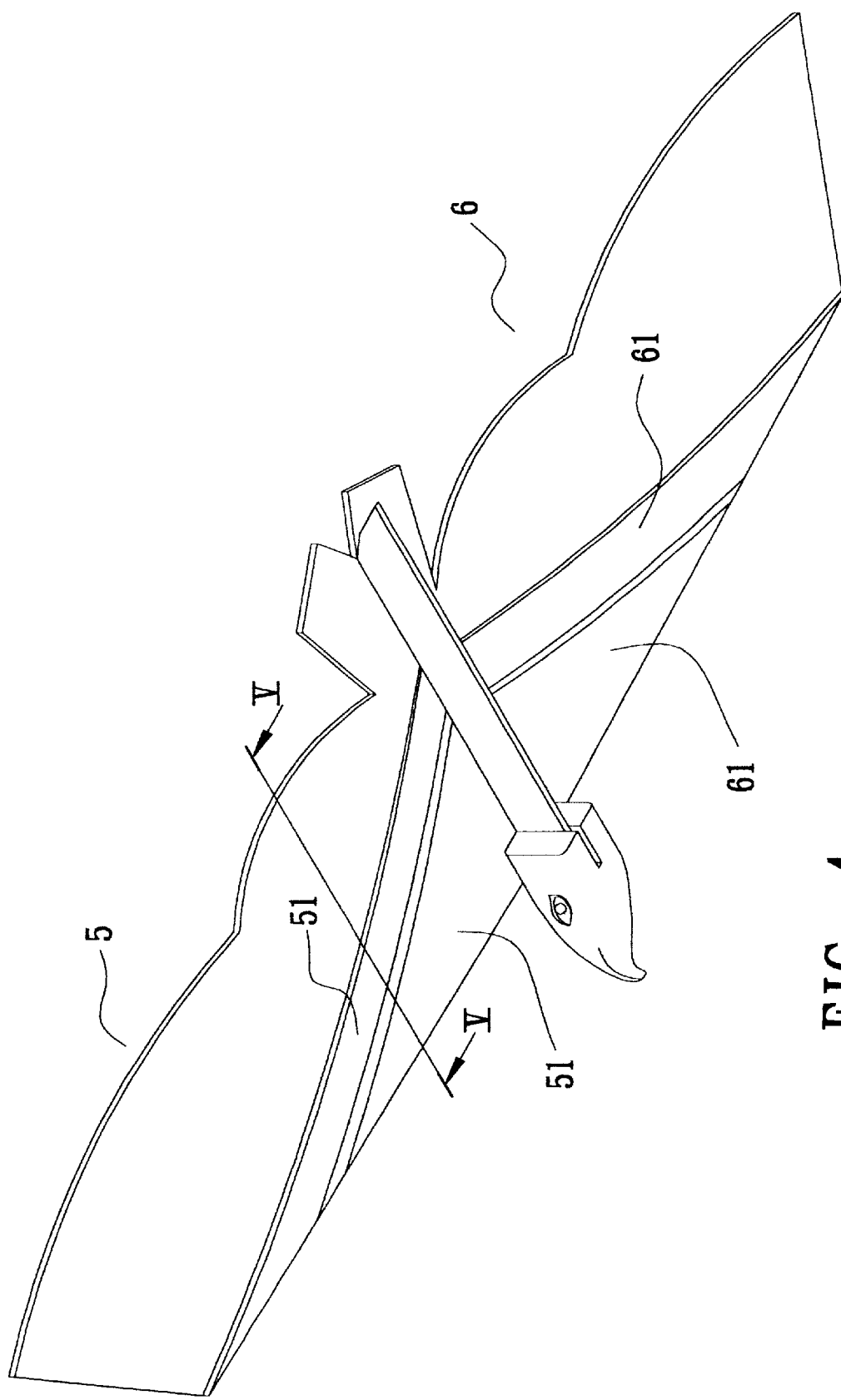
FIG. 4 is a perspective view of a second embodiment of the present invention.
Figure 5:
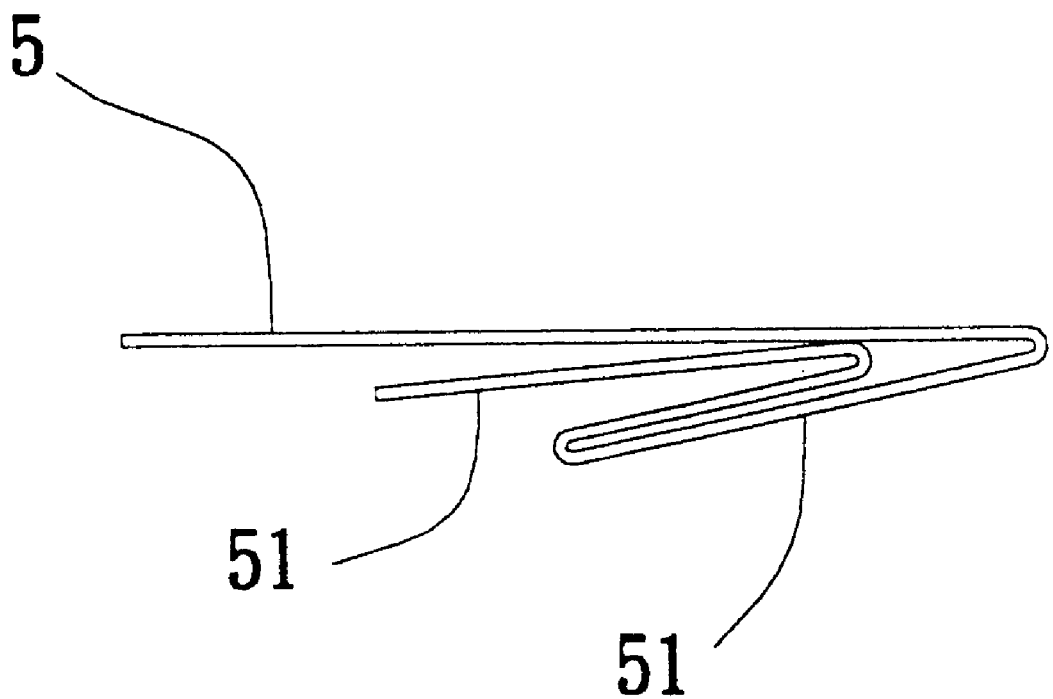
FIG. 5 is a sectional view taken along line V—V of FIG. 4.
Figure 6:
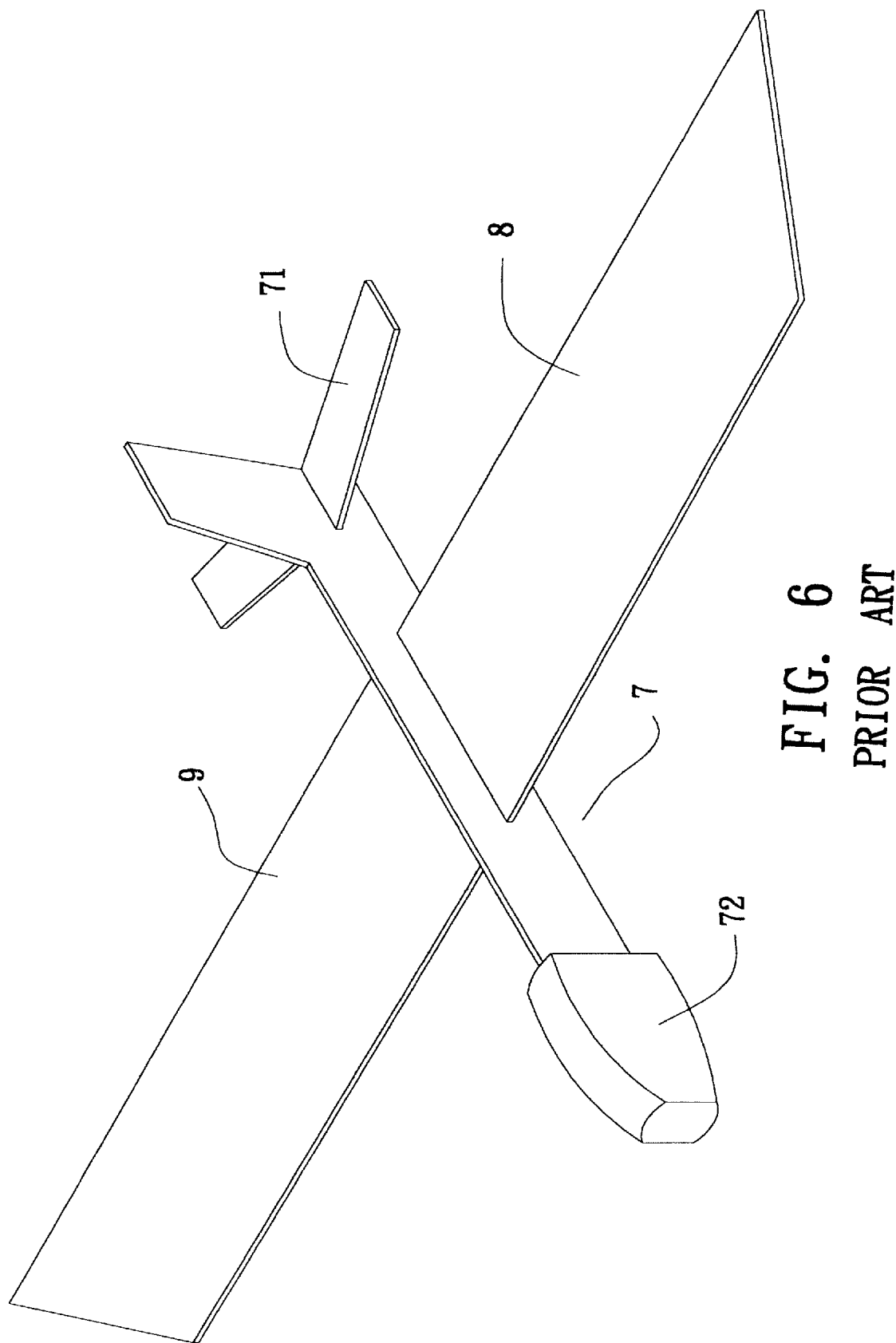
FIG. 6 is a perspective view of a conventional flier.

The above embodiment is only used to illustrate the present invention, not intended to limit the scope thereof. Many modifications of the above embodiment can be made without departing from the spirit of the present invention. For example, FIGS. 4 and 5 show a second embodiment of the present invention, in which two layers of left and right flow deflecting wings 51, 61 are respectively disposed under the bottoms of the port wing 5 and starboard wing 6 to achieve double flow deflecting effect and better flight.

What is claimed is:

1. A flier structure comprising a fuselage extending from front side to rear side, a weight body being connected with front end of the fuselage, a port wing and a starboard wing respectively leftward and rightward extending from the fuselage, the port wing and starboard wing having corresponding predetermined shape, a left tailfin and a right tailfin respectively extending from rear sides of the port wing and starboard wing, bottoms of front edges of the port wing and starboard wing being respectively connected with at least one left flow deflecting wing and right flow deflecting wing, rear sides of the left and right flow deflecting wings being respectively spaced from the port wing and starboard wing by a predetermined distance, the left and right flow deflecting wings being respectively connected with the left and right sides of the fuselage, the disconnected portions between the left deflecting wing and port wing and the right deflecting wing and starboard wing respectively forming two flow deflecting spaces.

2. The flier structure as claimed in claim 1, wherein rear side of the weight body is formed with an insertion split extending through the rear side from upper side to lower side of the weight body, the front end of the fuselage being inserted into the insertion split.

3. The flier structure as claimed in claim 1, wherein the left and right flow deflecting wings are respectively tapered toward the opposite outer sides and front sides of the port wing and starboard wing.

* * * * *